United States Patent

Komatsu et al.

[11] Patent Number: 5,689,387
[45] Date of Patent: Nov. 18, 1997

[54] DISK DRIVE APPARATUS HAVING IMPROVED DISK LOADING MECHANISM

[75] Inventors: Hisateru Komatsu; Takashi Watanabe; Makoto Takahashi, all of Yamagata, Japan

[73] Assignee: Mitsumi Electric Co., Ltd., Tokyo, Japan

[21] Appl. No.: 593,932

[22] Filed: Jan. 30, 1996

[30] Foreign Application Priority Data

Jan. 31, 1995 [JP] Japan .................... 7-013719

[51] Int. Cl.$^6$ .................... G11B 17/04
[52] U.S. Cl. .................... 360/99.06
[58] Field of Search .................... 360/99.06, 99.07, 360/99.02, 99.03; 363/75.2, 77.1

[56] References Cited

U.S. PATENT DOCUMENTS

| | | | |
|---|---|---|---|
| 4,786,998 | 11/1988 | Sugawara | 360/99.06 |
| 5,179,484 | 1/1993 | Nakajima | 360/99.06 |
| 5,335,124 | 8/1994 | Yokota | 360/99.06 |

Primary Examiner—A. J. Heinz
Attorney, Agent, or Firm—Hill, Steadman & Simpson

[57] ABSTRACT

A disk drive apparatus includes a mainframe equipped with a disk table which is rotated by a spindle motor, a disk holder which is provided on the mainframe so as to be movable in the up and down directions and which is adapted to hold a cartridge of a floppy disk, and an eject plate which is provided on the mainframe so as to be movable in the forward and backward directions, wherein the disk holder is moved up or down in conjunction with the forward and backward movement of the eject plate. The disk holder up and down mechanism includes at least three pins provided on each of the side plates of the disk holder, and at least three guide portions which are provided on each of the side plates of the eject plate so as to correspond to the pins of the disk holder, respectively and which are adapted to be cooperatively associated with the corresponding pins, in which each of the guide portions is formed from either a first guide portion which has only a slanting cam surface which acts on the corresponding pin when the eject plate is moved from its first position to its second position, or a second guide portion which has only a slanting cam surface which acts on the corresponding pin when the eject plate is moved from its second position to its first position. If three pins are provided on each side plate of the disk holder, the corresponding side plate of the eject plate is formed with two first guide portions and one second guide portion positioned therebetween.

11 Claims, 8 Drawing Sheets

DISK DRIVE APPARATUS HAVING IMPROVED DISK LOADING MECHANISM

BACKGROUND OF THE INVENTION

1. Field of the Invention

The present invention relates to a disk drive apparatus, and in particular relates to a disk drive apparatus for rotating an information recording/reproducing medium such as a flexible disk (hereinafter referred to as "disk") which is housed inside a cartridge.

2. Description of the Prior Art

One example of this type of disk drive apparatus is a floppy disk drive (FDD). In general, a floppy disk drive comprises a mainframe equipped with a disk table which is rotated by a spindle motor, a disk holder into which a cartridge having a disk therein is inserted or from which the disk is removed, the disk holder being movable in the up and down directions with respect to the mainframe to move the cartridge between a raised position (eject position) at which the cartridge can be inserted or removed and a lowered position (chucking position) at which the disk is chucked onto the disk table and a read/write operation is carded out, and an eject plate which is slidable horizontally above the mainframe in the backward and forward directions. In such a disk drive apparatus, the disk holder is moved up or down between the raised position and the lowered position by the forward and backward sliding movement of the eject plate.

In this connection, various up and down movement mechanisms may be employed to move the disk holder up and down between the raised position and the lowered position in accordance with the movement of the eject plate. One example of such a device known in the prior art comprises a pair of guide pins provided in a bilateral symmetrical arrangement on left and right side plates of the disk holder and a pair of slanting guide grooves which are formed in the left and right side plates of the eject plate so as to correspond to the left and right side plates of the disc holder, respectively. These guide pins of the disk holder are slidably engaged with the corresponding slanting guide grooves of the, eject plate, respectively. With this structure, by moving the eject plate horizontally in the forward and backward directions, the guide pins are moved up and down via the slanting guide grooves, whereby the disk holder is moved up and down between the raised position and the lowered position.

In general, this type of disk holder up and down movement mechanism, which employs guide pins and slanting guide grooves, has a simple structure with few parts, and for this reason such movement mechanisms are used in many disk drive apparatuses.

However, with this type of disk holder up and down movement mechanism, in order to carry out a smooth and stable guiding of the guide pin with the slanting guide groove, a high accuracy is required when setting the diameter of the guide pin and the width of the slanting groove and the positional relationship therebetween. Namely, if the width of the slanting guide groove is much larger than the diameter of the guide pin, rattling will arise when the disk holder is moved up and down, and if the width of the slanting guide groove is too narrow with respect to the diameter of the guide pin, it will not be possible to move the disk holder up and down smoothly.

Furthermore, the position and spacing of the pins provided on the side plates of the disk holder and the position and spacing of the slanting guide grooves provided in the side plates of the eject plate must be set so as to achieve a highly accurate bilateral symmetry in order to maintain balance when the disk holder is moved up and down.

Consequently, in such prior art floppy disk drives, the width of the slanting guide groove, the diameter of the guide pin and the positions and spacings thereof need to be set accurately. Further, when such floppy disk drives are assembled, the position of the guide pins and the slanting guide grooves must be precisely matched with each other.

SUMMARY OF THE INVENTION

The present invention has been made in view of the problems in the conventional disk drive apparatuses as described above. Accordingly, the main object of the present invention is to provide a disk drive apparatus which does not require accuracy in the dimensions of guide pins provided on a disk holder and pin guiding grooves which are formed on an eject plate for moving the guide pins up and down.

Another object of the present invention is to provide a disk drive apparatus in which is it not necessary to arrange the guide pins and the guide grooves symmetrically and precisely in left and right side plates of the disk holder and eject plate.

In order to achieve the object, a disk drive apparatus according to the present invention comprises:

a mainframe having a disk table which is rotated by a spindle motor;

a disk holder in which a cartridge having a disk therein is adapted to be held, the disk holder having a pair of side plates provided in parallel with an insertion direction of the cartridge, and the disk holder is movable vertically with respect to the mainframe between a first position at which the cartridge can be inserted into or removed from the disk holder and a second position at which the disk housed within the inserted cartridge can be placed on the disk table;

an eject plate having a pair of side plates which are provided so as to correspond to the side plates of the disk holder, respectively, the eject plate being slidably movable on the mainframe along the cartridge insertion direction between a first position and a second position which is shifted from the first position toward a removal direction of the cartridge; and means for moving the disk holder from its first position to its second position when the eject plate is moved from its first position to its second position, and for moving the disk holder from its second position to its first position when the eject plate is moved from its second position to its first position;

wherein the disk holder moving means comprises a plurality of pins provided on each of the side plates of the disk holder, and a plurality of guide means which are provided on each of the side plates of the eject plate so as to correspond to the pins of the disk holder, respectively and which are adapted to be cooperatively associated with the corresponding pins, and the plurality of guide means include a first guide portion which has a slanting cam surface which acts on the corresponding pin when the eject plate is moved from its first position to its second position, and a second guide portion which has a slanting cam surface which acts on the corresponding pin when the eject plate is moved from its second position to its first position.

According to the invention having the above structure, since it is sufficient to form one slanting cam surface in each of the guide portions of the eject plate at a predetermined position, there is no need to precisely control dimensions such as the diameter of the guide pins and the width of the guide grooves as is required in the prior art having the slanting guide grooves, and this makes it easy to construct the disk drive apparatus.

In another aspect of the present invention, a disk drive apparatus includes another disk holder moving mechanism which comprises at least three pins provided on each of the side plates of the disk holder, and at least three guide means which are provided on each of the side plates of the eject plate so as to correspond to the pins of the disk holder, respectively and which are adapted to be cooperatively associated with the corresponding pins, and the guide means include a first guide portion which has only a downward-movement slanting cam surface which acts on the corresponding pin when the eject plate is moved from its first position to its second position, and a second guide portion which has only an upward-movement slanting cam surface which acts on the corresponding pin when the eject plate is moved from its second position to its first position, and wherein in each of the side plates of the eject plate, there are provided two first guide portions and one first guide portion positioned therebetween.

According to this aspect, when chucking is carried out with the disk drive apparatus, because the downward-movement slanting cam surfaces of the side plates of the eject plate push four guide pins which have the largest front-to-back spacing, namely the front and rear guide pins of the left and right side plates of the disk holder, it is possible to maintain the disk holder in a stable holding state, and this in turn makes it possible to carry out stable reading and writing operations.

In yet another aspect of the present invention, a disk drive apparatus includes another disk holder moving mechanism which comprises at least three pins provided on each of the left and right side plates of the disk holder in such a manner that positions and spacing of the pins on the left side plate are asymmetrical to those of the pins on the right side plate, and at least three guide means are provided on each of the left and right side plates of the eject plate so as to correspond to the pins of the disk holder, respectively and which are adapted to be cooperatively associated with the corresponding pins, and the guide means in each side plate of the eject plate include a first guide portion which has only a downward-movement slanting cam surface which acts on the corresponding pin when the eject plate is moved from its first position to its second position, and a second guide portion which has only an upward-movement slanting cam surface which acts on the corresponding pin when the eject plate is moved from its second position to its first position.

Such asymmetrical arrangement of the pins of the guide holder and the guide means of the eject plate is particularly advantageous when the disk drive apparatus is constructed into the embodiment of this invention.

In this case, if an unbalanced condition would be caused due to such an asymmetrical arrangement, it is possible to further provide a compensating means for compensating the unbalanced condition in the movement of the disk holder. This unbalanced condition compensating means is an arrangement of the first and second guide portions in the respective side plates of the eject plate in which the number and/or order of the first and second guide portions in the left side plate of the eject plate are different from those of the right side plate. Preferably, if one of the left and right side plates of the disk holder is shorter than that of the other side plate, and one of the left and right side plates of the eject plate is also shorter than that of the other side plate thereof in the same manner as the disk holder, two first guide portions and one second guide portion are formed on the one side plate of the eject plate, and one first guide portion and two second guide portions are formed on the other side plate of the eject plate.

Other objects, structure and operation of the present invention will be apparent when the following description of the preferred embodiments is considered taken in conjunction with the accompanying drawings.

BRIEF DESCRIPTION OF THE DRAWINGS

FIGS. 2(A), 2(B) and 2(C) show the structure of a subframe of the disk drive apparatus of the first embodiment, in which FIG. 2(A) is a left side view of the subframe, FIG. 2(B) is a top plan view of the subframe, and FIG. 2(C) is a right side view of the subframe;

FIGS. 3(A), 3(B) and 3(C) show the structure of a disk holder of the first embodiment, in which FIG. 3(A) shows the structure of the left side plate of the disk holder, FIG. 3(B) is a top plan view of the disk holder, and FIG. 3(C) shows the structure of the right side plate of the disk holder;

FIGS. 4(A), 4(B) and 4(C) show the structure of an eject plate of the first embodiment, in which FIG. 4(A) shows the structure of the left side plate of the eject plate, FIG. 4(B) is a top plan view of the eject plate, and FIG. 4(C) shows the structure of the right side plate of the eject plate;

FIGS. 5(A), 5(B) and 5(C) are illustrations which show the operation of the up and down movement mechanism of the first embodiment which are viewed from the right side thereof, in which FIG. 5(A) shows the condition that the disk holder is in the raised position (eject position), 5(B) shows the condition that the disk holder is moving toward the lowered position (chucking position) from the raised position; and 5(C) shows the condition that the disk holder is in the lowered position;

FIGS. 6(A), 6(B) and 6(C) show the structure of an eject plate of a second embodiment of the disk drive apparatus according to the present invention, in which FIG. 6(A) shows the structure of the left side plate of the eject plate, FIG. 6(B) is a top plan view of the eject plate, and FIG. 6(C) shows the structure of the right side plate of the eject plate;

FIGS. 7(A) and 7(B) are illustrations for showing the operation of the up and down movement mechanism of the second embodiment which are viewed from the left side thereof, in which FIG. 7(A) shows the condition that the disk holder is in the raised position and 7(B) shows the condition that the disk holder is in the lowered position;

FIG. 8(A) and FIG. 8(B) are illustrations for showing the operation of the up and down movement mechanism of the second embodiment which are viewed from the right side thereof, in which FIG. 8(A) shows the condition that the disk holder is in the raised position and 8(B) shows the condition that the disk holder is in the lowered position.

DETAILED DESCRIPTION OF THE PREFERRED EMBODIMENTS

Figure 1:
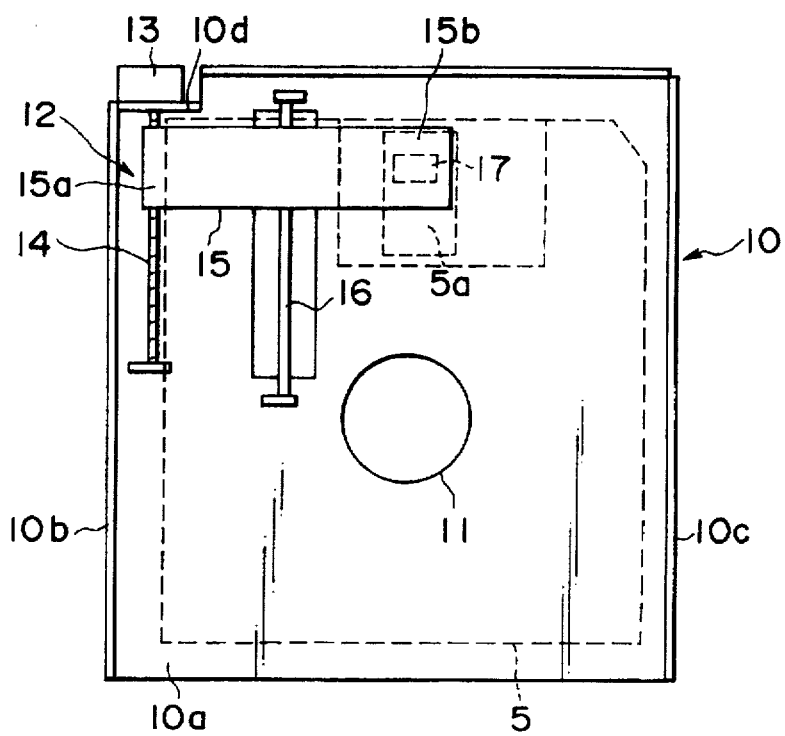
FIG. 1 is an illustration which shows a positional relationship among the main components of a first embodiment of a disk drive apparatus according to the present invention.

With reference to the drawings, a description of the preferred embodiments will now be given below. In this connection, these embodiments of a disk drive apparatus according to the present invention are illustrated for the case where this invention is applied to a thin-type floppy disk drive which is mainly used in notebook-size personal computers for 3.5 inch floppy disks. Further, it is to be noted that "left", "right", "forward" and "backward" refer to directions seen by an observer when viewing an insertion port of the disk drive (i.e., when viewing the front of the disk drive).

FIGS. 1–5 illustrate a floppy disk drive according to a first embodiment of the present invention. As shown in these drawings, the floppy disk drive comprises a mainframe 10 equipped with a disk table 11 which is rotated by a spindle motor (not shown in the drawings), a disk holder 30 which is adapted to hold a cartridge 5 of a 3.5 inch floppy disk therein and which is provided above the mainframe 10 so as to be movable in the up and down directions with respect to the mainframe, and an eject plate 20 which is provided on the mainframe 10 so as to be slidable in the forward and backward directions (i.e., the cartridge insertion and removing directions) with respect to the mainframe 10, wherein the disk holder 30 is moved up and down in conjunction with the forward and backward movement of the eject plate 20.

As shown in FIG. 1, the mainframe 10 comprises a roughly square-shaped bottom plate portion 10a having dimensions that are slightly larger (approximately 1 cm–2 cm) than the outer dimensions of the cartridge 5 of a 3.5 inch floppy disk, left and right side walls 10b, 10c which are erected at the left and right side edges of the bottom plate portion 10a, and a motor support plate 10d which is erected at the left end of the back edge of the bottom plate portion 10a.

Provided at a left rear portion of the mainframe 10 is a magnetic head carriage mechanism 12. This carriage mechanism 12 is comprised of a stepping motor 13 provided on the rear surface of the motor support plate 10d, a lead screw 14 which is rotated by the motor 13, a carriage assembly 15 which is provided on the lead screw 14 in a manner that enables the carriage assembly 15 to be moved in the forward and backward directions in accordance with the rotation of the lead screw 14, and a guide bar 16 for guiding the movement of the carriage assembly 15. The lead screw 14 is positioned near the left side wall 10b and extends roughly parallel with the left side wall 10b up to the vicinity of the central portion of the bottom plate portion 10a such that the lead screw 14 is positioned between the left side wall 10a and the left side edge of the cartridge 5 when the cartridge 5 is inserted into the disk holder 30. Further, the carriage assembly 15 comprises a base end portion 15a which is connected to the lead screw 14, and top and bottom arms 15b, 15b which extend from the base end portion 15a to an access window 5a of the cartridge 5 in a direction which is roughly perpendicular to the axial direction of the lead screw 14. Provided inside tip portions of these arms 15b, 15b are magnetic heads 17, 17 which sandwich top and bottom of the disk at the access window 5a of the inserted cartridge 5, whereby it is possible to carry out read and write operations on such a disk.

In this way, in the above-described floppy disk drive, the motor 13 and the lead screw 14 for moving the carriage assembly 15 are arranged at a position which is to the left of the cartridge 5, and the top and bottom arms 15b, 15b extend from such left side to the right in a direction which is perpendicular to the axis of the lead screw 14, whereby the magnetic heads 17, 17 are positioned at the access window 5a of the cartridge 5.

Figure 9:
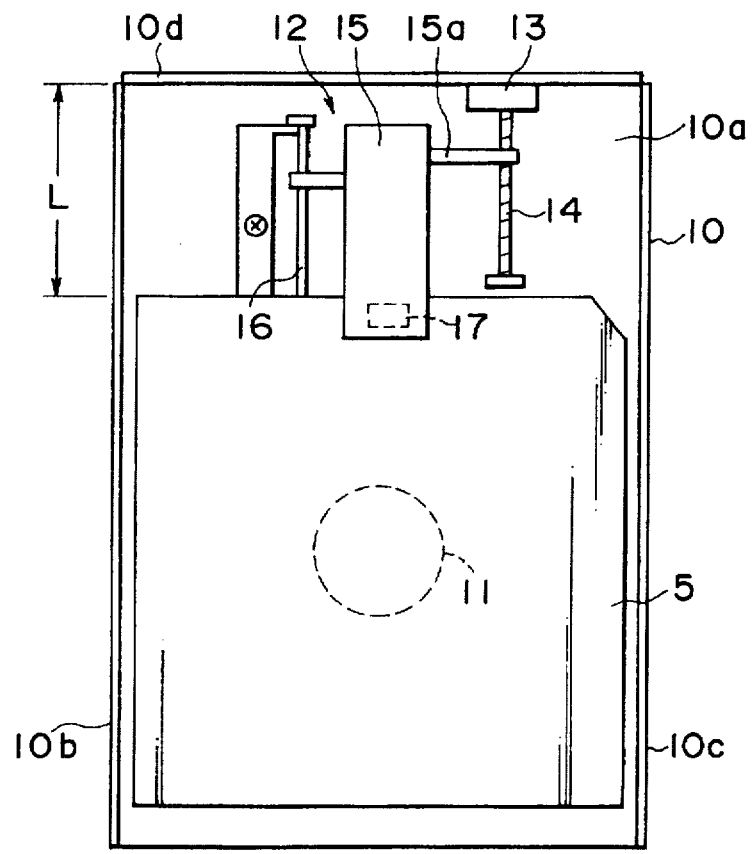
FIG. 9 is an illustration which shows a structure of a mainframe of other disk drive apparatus to which the up and down movement mechanism of the present invention can be applied.

Namely, in this floppy disk drive, the carriage assembly 15 is arranged along a direction which is perpendicular to the direction of the prior art carriage assembly shown in FIG. 9, and in such arrangement the arms 15b, 15b extend from the left side of the cartridge 5 toward the access window 5a of the cartridge 5. By constructing the floppy disk drive in this way, the range of movement of the carriage assembly 15 can be restricted so that the movement of the carriage assembly 15 toward the rear will stop at roughly the back end of the inserted cartridge 5, and in comparison with the structure of the prior art carriage assembly shown in FIG. 9, in the present embodiment it is possible to reduce the space required for movement of the carriage assembly by the amount "L" shown in FIG. 9. As a result, it is possible to shorten the back-to-front dimension of the floppy disk drive, and this in turn makes it possible to construct an extremely compact disk drive.

Figure 2A:
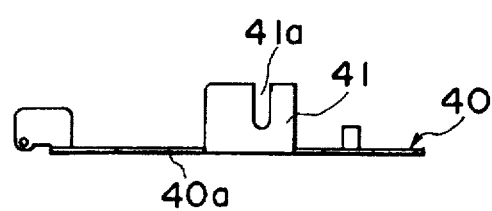
Figure 2B:
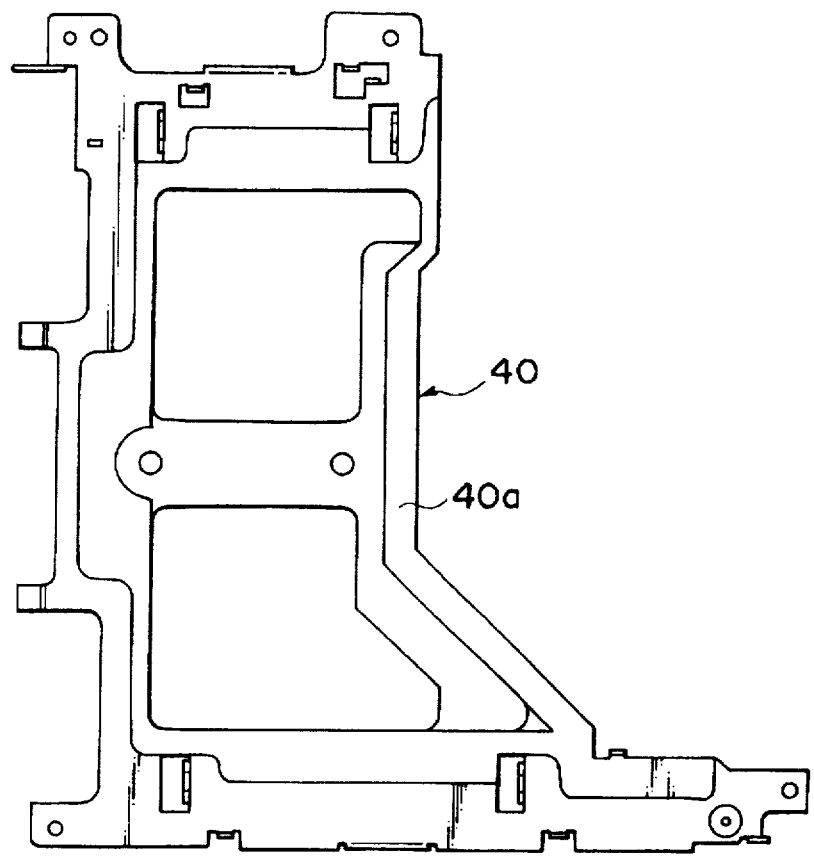
Figure 2C:
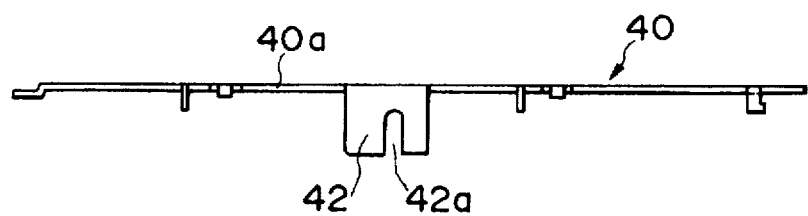
Figure 5A:
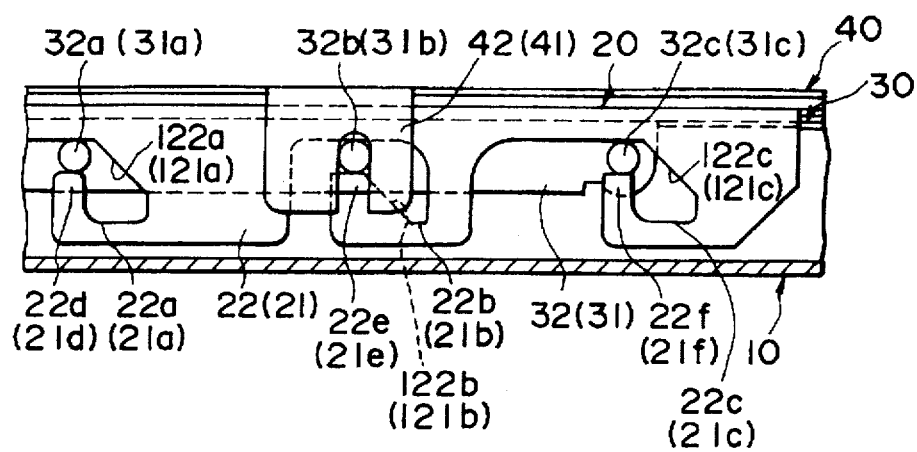
Figure 5B:
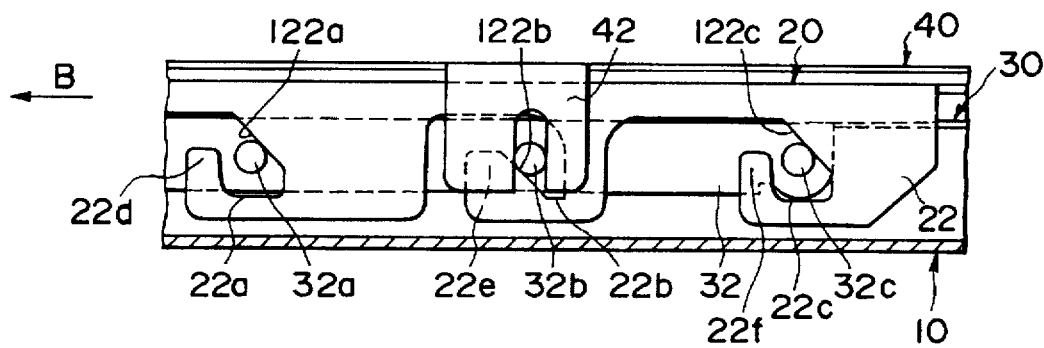
Figure 5C:
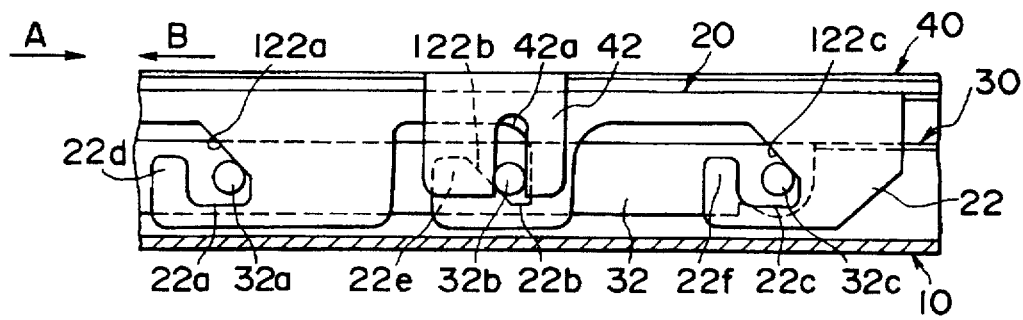
Figure 6A:
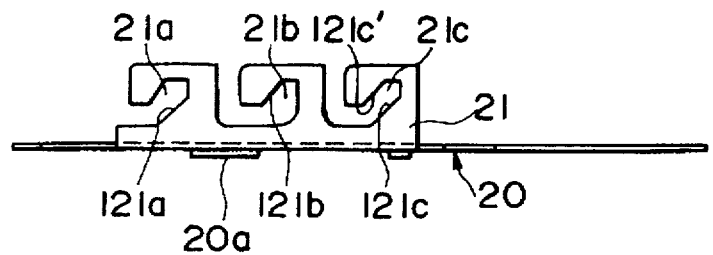
Figure 6B:
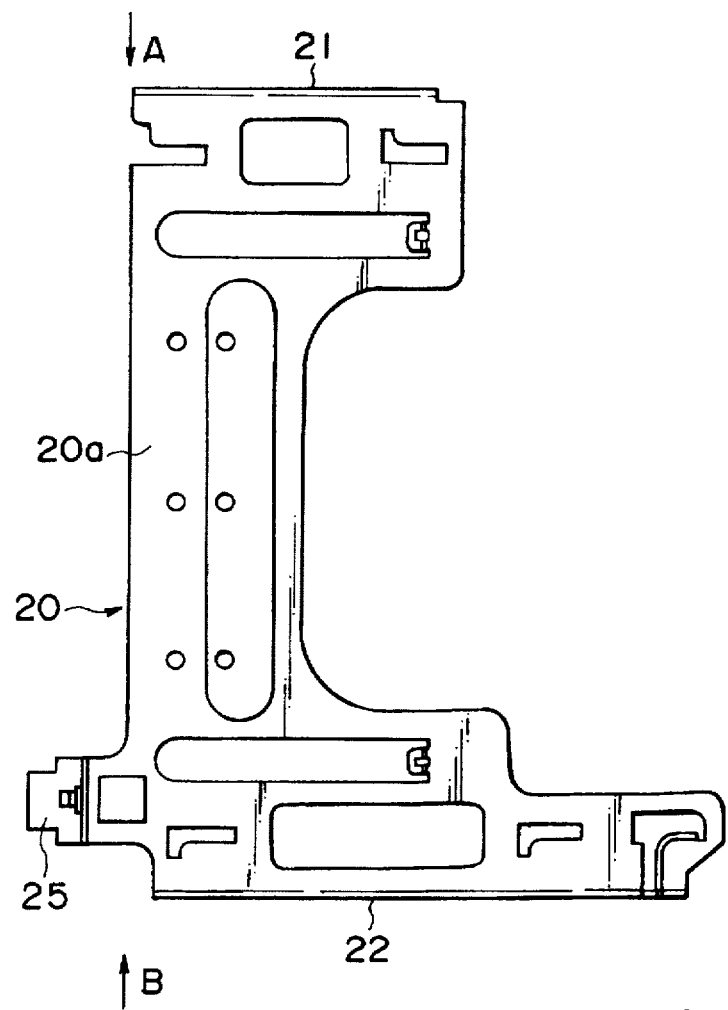
Figure 6C:
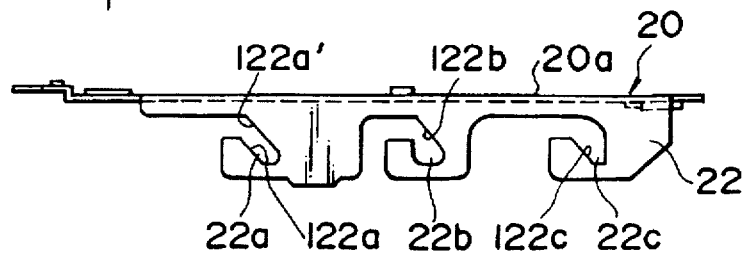

FIG. 2(A) to FIG. 2(C) show a subframe 40 which is attached by means of a screw to the top of the left and right side walls 10b, 10c of the mainframe 10. As is further shown in FIG. 2(A) to FIG. 2(C), the subframe 40 includes a top plate portion 40a, and pin guiding plates 41, 42 are formed at left and right edge portions of the subframe 40 so as to extend downwards therefrom in a direction which is perpendicular to the subframe 40. Further, as shown in FIG. 2(A) and FIG. 2(C), each of the pin guiding plates 41, 42 has an inverted U-shaped pin guide groove 41a, 42a, respectively, and as will be described hereinbelow, these pin guide grooves 41a, 42a guide the disk holder 30 in the up and down directions. In this way, the mainframe 10 and the subframe 40 form an assembly in which a disk holder accommodating space having a long and narrow rectangular cross section is defined, and the disk holder is arranged within the space so as to move up and down, as shown in FIG. 5(A) to FIG. 5(C).

Figure 3A:
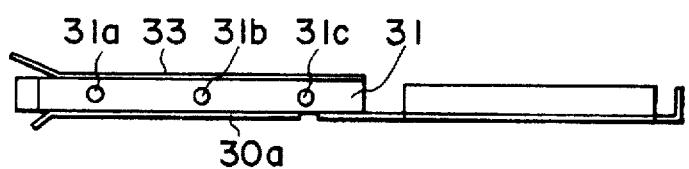
Figure 3B:
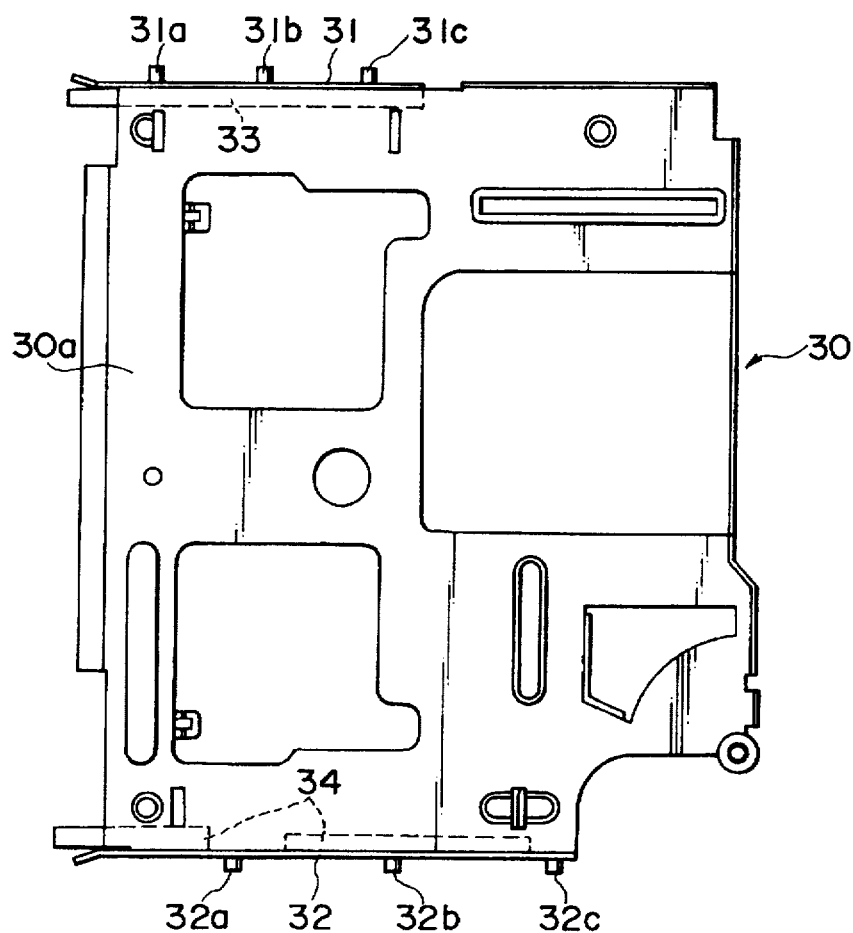
Figure 3C:
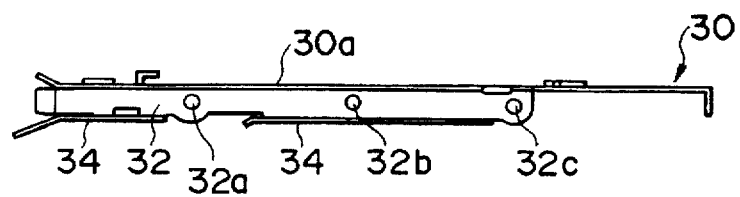

Now, as shown in FIG. 3(A) to FIG. 3(C), the disk holder 30 comprises a roughly square-shaped top plate portion 30a, left and right side plates 31, 32 which are provided at left and right edge portions of the top plate portion 30a so as to extend downwards therefrom in a direction which is perpendicular to the top plate portion 30a, and disk support sheets 33, 34 which are respectively formed at bottom edge portions of the side plates 31, 32 so as to extend inwardly therefrom in a direction which is perpendicular to the side plates 31, 32. In this way, the top plate portion 30a, left and right side plates 31, 32 and disk support sheets 33, 34 form a cartridge accommodating space which has a long and narrow rectangular cross section.

Now, as shown in these drawings, the dimensions of the left and right side plates 31, 32 of the disk holder 30 in the direction for inserting a cartridge are set so as to make the length of the left side plate 31 shorter than the length of the right side plate 32. In this regard, it should be understood that the left side plate 31 is constructed to be made short due to its relationship with the space for arranging the above-mentioned carriage mechanism 12.

The left and right side plates 31, 32 are respectively provided with three protruding guide pins 31a, 31b, 31c and 32a, 32b, 32c which are arranged so as to have a prescribed spacing therebetween. In particular, because the left side plate 31 is shorter than the right side plate 32, as described above, the spacing of the guide pins 31a, 31b, 31c of the left side plate 31 is smaller than the spacing of the guide pins 32a, 32b, 32c of the right side plate 32. In this way, in the disk holder 30, there is a left-right asymmetrical relationship between the positions and spacings of the guide pins 31a, 31b, 31c and 32a, 32b, 32c of the left and right side plates 31, 32 due to the provision of the carriage mechanism 12 at such a position as described above.

Further, the central guide pins 31b, 32b which are positioned roughly in the center of the left and right side plates 31, 32 respectively mate with the inverted U-shaped pin guide grooves 41a, 42a formed in the left and right pin guide plates 41, 42 of the above-described subframe 40, whereby the disk holder 30 can be moved within the assembly comprised of the mainframe 10 and subframe 40 only in the up and down directions.

Now, as will be made clear from FIG. 5(A) to FIG. 5(C), the eject plate 20 is provided between the disk holder 30 and the subframe 40 of the above-described structure so as to be slidably movable between a first position that is close to the rear of the disk drive and a second position that is shifted toward the front of the disk drive from the first position. The eject plate 20 is normally biased to move from the first position to the second position by a spring means not shown in the drawings. Further, the eject plate 20 is held in a latched state at the first position by means of a latching means not shown in the drawings. This condition is shown in FIG. 5(A). When the eject plate 20 is released from such latched state by insertion of a cartridge, the biasing force of the spring means causes the eject plate 20 to move from the first position toward the second position as indicated by the arrow B in FIG. 5(B). On the other hand, when an eject operation is to be carried out by pressing an eject button 25 from the outside of the disk drive, the eject plate 20 is moved from the second position to the first position against the biasing force of the spring means as indicated by the arrow A in FIG. 5(C), whereby the eject plate 20 is latched again at the first position by the latching means.

Figure 4A:
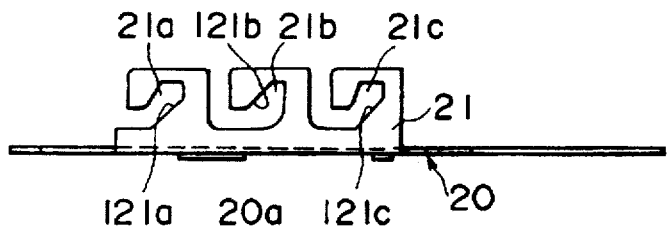
Figure 4B:
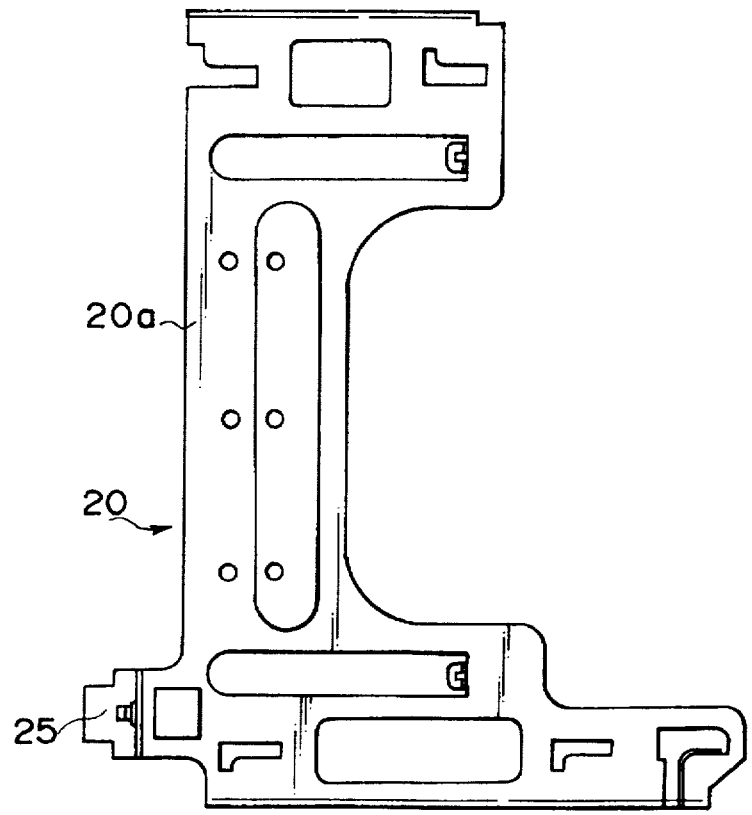
Figure 4C:
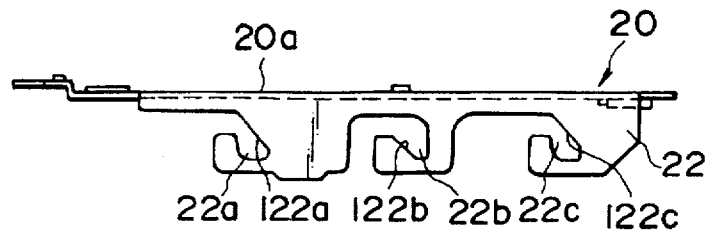

As shown in FIG. 4(A) to FIG. 4(C), the eject plate 20 has a top plate portion 20a which has a slightly larger left-to-right width than that of the disk holder 30 and which is positioned between the top plate portion 40a of the subframe 40 and the top plate 30a of the disk holder 30, and left and right side plates 21, 22 formed at left and right side edge portions of the top plate portion 20a so as to extend downwards therefrom in a direction which is perpendicular to the top plate portion 20a. Further, the eject plate 20 is arranged so that the left and right plates 21, 22 are positioned over the left and right side plates 31, 32 of the disk holder 30 with the pin guiding plates 41, 42 of the subframe 40 being arranged outside the left and right side plates 21, 22. In a manner similar to that for the disk holder 30, the dimensions of the left and right side plates 21, 22 of the eject plate 20 in the direction for inserting a cartridge are set so as to make the length of the left side plate 21 roughly half the length of the right side plate 22. In this regard, it should be noted that the eject plate 20 may be constructed such that its top plate 20a is positioned between the disk holder 30 and the mainframe 10, and the left and right side plates 21, 22 extend upwardly from the left and right side edges thereof in a direction which is perpendicular to the top plate portion 20a.

Provided in the above construction of the disk holder 30 and the eject plate 20 is a disk holder up and down movement mechanism for moving the disk holder 30 up and down in conjunction with the movement of the eject plate 20 in the forward and backward directions. This disk holder up and down movement mechanism is constructed from a plurality of guide pins provided on the left and right side plates 31, 32 of the disk holder 30, respectively, and a plurality of guiding means formed on the left and right side plates 21, 22 of the eject plate 20 so as to correspond to the guide pins, respectively. Each of the plurality of guiding means is constructed from either a first guiding portion or a second guiding portion which is operatively associated with the corresponding guide pin, respectively.

In more details, in this embodiment, a set of three guide portions 21a, 21b, 21c, which are cooperatively associated with the guide pins 31a, 31b, 31c of the left side plate 31 of the disk holder 30, respectively, are formed in the left side plate 21 of the eject plate 20, as shown in FIG. 4(A), and a set of three guide portions 22a, 22b, 22c, which are cooperatively associated with the guide pins 32a, 32b, 32c of the right side plate 32 of the disk holder 30, respectively, are formed in the right side plate 22 of the eject plate 20, as shown in FIG. 4(C).

Further, the guide portions 21a, 21b, 21c and 22a, 22b, 22c of the left and right side plates 21, 22 of the eject plate 20 are formed with slanting cam surfaces to engage respectively the corresponding guide pins 31a, 31b, 31c and 32a, 32b, 32c of the left and right side plates 31, 32 of the disk holder 30, as explained below.

Namely, as shown in FIG. 4(A), downward-movement slanting cam surfaces 121a and 121c are formed respectively in the front and rear guide portions 21a, 21c of the left side plate 21 of the eject plate 20. These cam surfaces 121a and 121c abut with the front and rear guide pins 31a, 31c of the left side plate 31 of the disk holder 30 so as to push the guide pins 31a, 31c downward to move (i.e., lower) the disk holder 30 from a raised position (eject position) to a lowered position (chucking position) when the eject plate 20 is moved forward (from the first position to the second position) by the biasing force of the spring means (not shown in the drawings) after being released from its latched state by the insertion of a cartridge (see FIG. 5(B)). These guide portions 21a, 21c which have only such a downward-movement slanting cam surface are defined as a first guide portion in this invention. Further, an upward-movement slanting cam surface 121b is formed in the center guide portion 21b of the left side plate 21. The cam surface 121b abuts with the center guide pin 31b of the left side plate 31 of the disk holder 30 so as to push the guide pin 31b upward to move the disk holder 30 from the chucking position to the eject position when the eject plate 20 is moved from the second position to the first position by an eject operation carried out for the eject plate 20. The guide portion 21b which has only such a downward-movement slanting cam surface is defined as a second guide portion in this invention.

Further, in the same manner as was described above for the guide portions 21a, 21c of the left side plate 21, downward-movement slanting cam surfaces 122a and 122c are formed respectively in the front and rear guide portions 22a, 22c of the right side plate 22 of the eject plate 20 as shown in FIG. 4(A). These cam surfaces 122a, 122c abut with the front and rear guide pins 32a, 32c of the right side plate 32 of the disk holder 30 so as to push the guide pins 32a, 32c downward when the eject plate 20 is moved from the first position to the second position by the biasing force of the spring means after being released from its latched state by the insertion of a cartridge. Further, in the same manner as described above for the center guide groove 21b of the left side plate 21, an upward-movement slanting cam surface 122b is formed in the middle guide groove 22b of the right side plate 22. The cam surface 122b abuts with the center guide pin 32b of the disk holder 30 so as to push the guide pin 32b upward when the eject plate 20 is moved from the second position to the first position by an eject operation carded out for the eject plate 20.

In other words, even though the spacing is different for the three guide portions of the left and right side plates 21, 22 of the eject plate 20, the three guide potions of both the left and right side plates 21, 22 perform the same function in the same ordered arrangement. Namely, the left and right side plates 21, 22 are provided with first guide portions comprised of the front and back guide portions 21a, 21c and 22a, 22c and second guide portions comprised of the center guide potions 21b and 22b, respectively.

These guide portions are formed in the side plates 21, 22 of the eject plate 20 by punching out portions thereof so as to have predetermined shapes as show in FIGS. 4(A) and 4(C).

Next, with reference to FIGS. 5(A) to 5(C), a description of the operation of the floppy disk drive apparatus according to the present embodiment will be given. In this regard, these drawings show the structure of the floppy disk drive according to the present embodiment when viewed from the right side thereof.

First, when the above-described floppy disk drive is to be used, the disk holder 30 is normally in the eject position, as shown by FIG. 5(A). In this state, each of the guide pins of the disk holder 30 are supported by support sheets 21d, 21e, 21f, 22d, 22e, 22f formed in the entrance port of the respective guide portions of the left and right side plates 21, 22 of the eject plate 20. In this connection, the reference characters shown in brackets in FIG. 5(A) indicate corresponding elements as seen from the left side of the floppy disk drive.

In this state, when a floppy disk cartridge 5 is inserted into the disk holder 30, the eject plate 20 is released from its latched state with the latching device, and then the biasing force of the spring means causes the eject plate 20 to move from the first position to the second position in the direction indicated by the arrow B.

At this time, in conjunction with the movement of the eject plate 20, the first guide portions provided in the left and right plates 21, 22, namely the downward-movement slanting cam surfaces 121a, 121c, 122a, 122c formed in the front and rear guide potions 21a, 21c, 22a, 22c, push the front and rear guide pins 31a, 31c, 32a, 32c of the left and right side plates 31, 32 of the disk holder 30 downward, as shown in FIG. 5(B). At the same time, the center guide pins 31b, 32b of the left and right side plates 31, 32 of the disk holder 30 follow the upward-movement slanting cam surfaces 121b, 122b of the center guide portions 21b, 22b of the left and right side plates 21, 22 of the eject plate 20 and are guided downward by the pin guiding grooves 41a, 42a of the subframe 40.

In this way, the disk holder 30 is moved from the eject position to the chucking position, as shown in FIG. 5(C). Namely, when chucking is carded out in the floppy disk drive, the disk holder 30 is pushed downward by means of a total of four guide pins comprised of two guide pins 31a, 31c and two guide pins 32a, 32c provided respectively on the left and right side plates 31, 32 of the disk holder 30, whereby the cartridge 5 is supported by disk supporting members (not shown in the drawings) provided on top of the mainframe 10 through the downward-movement cam surfaces of the eject plate 20.

On the other hand, when the disk holder 30 is to be moved from the chucking position shown in FIG. 5(C) to the eject position, an eject button 25 (see FIG. 4(B)) is operated to push the eject plate 20 against the biasing force of the spring means. When this eject operation is carded out, the eject plate 20 is moved from the second position to the first position, and in conjunction with this movement, the upward-movement slanting cam surfaces 121b, 122b formed in the center guide portions 21b, 22b of the left and right side plates 21, 22 of the eject plate 20 push the center guide pins 31b, 32b of the left and right side plates 31, 32 of the disk older 30 upwards.

As a result, the disk holder 30 follows the pin guide grooves 41a, 42a of the subframe 40 and thereby moves upward to the eject position shown in FIG. 5(A) after passing through the state shown in FIG. 5(B).

In this way, when an ejecting operation is carded out in the first embodiment of a floppy disk drive, the disk holder 30 is moved upward by the pushing force of the second guide portions of the left and right side plates 21, 22 of the eject plate, namely the upward-movement slanting cam surfaces 121b, 122b of the guide portions 21b, 22b, which acts on the center guide pins 31b, 32b of the left and right side plates 31, 32 of the disk holder 30.

As was described above, in the eject plate 20 of the present embodiment, each of the front and rear guide portions 21a, 21c, 22a, 22c has only the downward-movement slanting cam surface for moving the disk holder 30 from the eject position to the chucking position, and each of the center guide portions 21b, 22b has only the upward-movement slanting cam surface for moving the disk holder 30 from the chucking position to the eject position. Accordingly, in this invention, since it is sufficient to form one such slanting cam surface in each of the guide portions of the eject plate 20 at a predetermined position, there is no need to precisely control dimensions such as the diameter of the guide pins and the width of the guide grooves as is required in the prior art having slanting guide grooves, and this makes it easy to construct the floppy disk drive according to the present invention.

Further, when chucking is carded out with the floppy disk drive of the above embodiment, because the downward-movement slanting cam surfaces 121a, 121c, 122a, 122c of the left and right side plates 21, 22 of the eject plate 20 push four guide pins which have the largest front-to-back spacing, namely the front and rear guide pins 31a, 31c, 32a, 32c of the left and right side plates 31, 32 of the disk holder 30, it is possible to maintain the disk holder 30 in a stable holding state, and this in turn makes it possible to carry out stable reading and writing operations.

Next, with reference to FIGS. 6(A)–6(C), 7(A), 7(B), 8(A) and 8(B), a description of a disk drive apparatus according to a second embodiment of the present invention will be given. This second embodiment is similar to the first embodiment in that a left-right asymmetry is created with regards to the length of the left and right side plates of the disk holder and the spacing of the guide pins. However, in order to compensate for unbalanced states which would arise during the raising and lowering of the disk holder due to such asymmetrical structure, the second embodiment is additionally provided with a balance compensation means to carry out balance compensation during movement of the disk holder. The balance compensation means is the allocation of the first and second guide portions in each side plate of the eject plate and the ordered arrangement thereof. Namely, in this embodiment, such unbalanced condition is compensated by appropriately changing the number and order of the first and second guide portions in one side plate from those in the other side plate.

Namely, in this second embodiment, downward-movement slanting cam surfaces 121a and 121c are formed respectively in the front and rear guide portions 21a, 21c of the left side plate 21 of the eject plate 20. These cam surfaces 121a and 121c abut with the front and rear guide pins 31a, 31c of the left side plate 31 of the disk holder 30 so as to push the guide pins 31a, 31c downward to move (i.e., lower) the disk holder 30 from the eject position to the chucking position when the eject plate 20 is moved from the first position to the second position by the biasing force of the spring means after being released from its latched state by the insertion of a cartridge. Accordingly, each of the guide portions 21a, 21c acts as the first guide portion. Further, an upward-movement slanting cam surface 121b is formed in the center guide portion 21b of the left side plate 21. This cam surface 122b abuts with the center guide pin 31b of the left side plate 31 of the disk holder 30 so as to push the guide pin 31b upward in order to move the disk holder 30 from the chucking position to the eject position when the eject plate 20 is moved from the second position to the first position by an eject operation carded out for the eject plate 20. Accordingly, the guide portion 21b acts as the second guide portion.

On the other hand, in the right side plate 22 of this embodiment, upward-movement slanting cam surfaces 122a, 122c are formed in the front and rear guide portions 22a, 22c of the right side plate 22 of the eject plate 20. These cam surfaces abut with the front and rear guide pins 32a, 32c of the disk holder 30 so as to push the guide pins 32a, 32c upward when the eject plate 20 is moved from the second position to the first position. Namely, each of the guide portions 22a, 22c acts as the second guide portion. Further, a downward-movement slanting cam surface 122b is formed in the center guide portion 22b of the right side plate 22 of the eject plate 20. The cam surface 122b abuts with the center guide pin 32b of the right side plate 32 of the disk holder 30 so as to push the guide pin 32b downward to move the disk holder 30 from the eject position to the chucking position when the eject plate 20 is moved from the first position to the second position by the biasing force of the spring means after being released from its latched state by the insertion of a cartridge. Accordingly, the center guide groove 22b acts as the first guide portion.

Further, in order to assist the raising of the disk holder 30, an additional slanting surface 121c' can be formed in a lower side of the rear guide portion 21c of the left side plate 21 of the eject plate 20. This additional slanting cam surface 121c' abuts with the guide pin 31c of the left side plate 31 when the guide pin 31b thereof approaches the eject position as it moves upward following the slanting cam surface 121b of the center guide portion 21b of the eject plate 20. Further, in order to assist the holding of the disk holder 30 in the chucking position, an additional slanting surface 122a' can be formed in the front guide portion 22a of the right side plate 22 of the eject plate 20. This additional slanting surface 122a' abuts with the guide pin 32a of the right side plate 32 when the center guide pin 32b thereof approaches the chucking position as it moves downward following the slanting cam surface 122b of the center guide groove 22b of the eject plate 20. The provisions of such additional cam surfaces in the particular guide portions provide more stable and smooth operation.

Figure 7A:
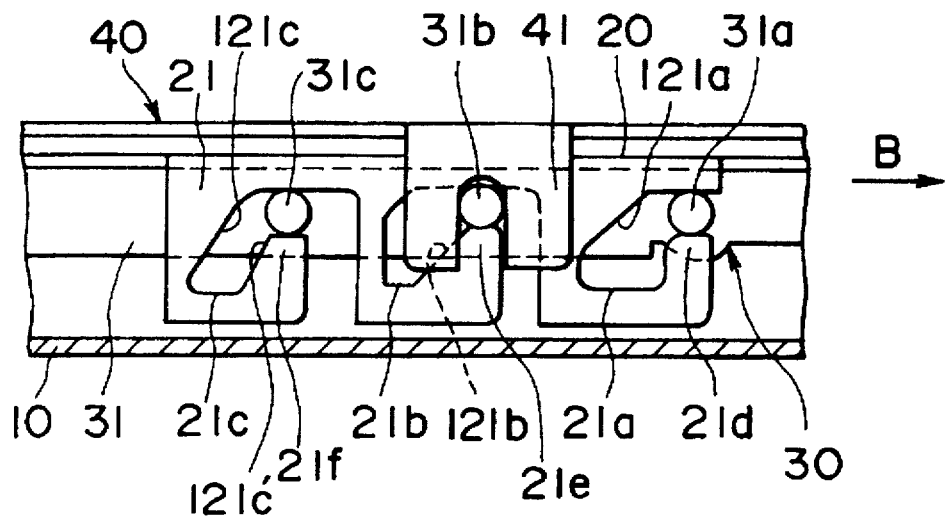
Figure 7B:
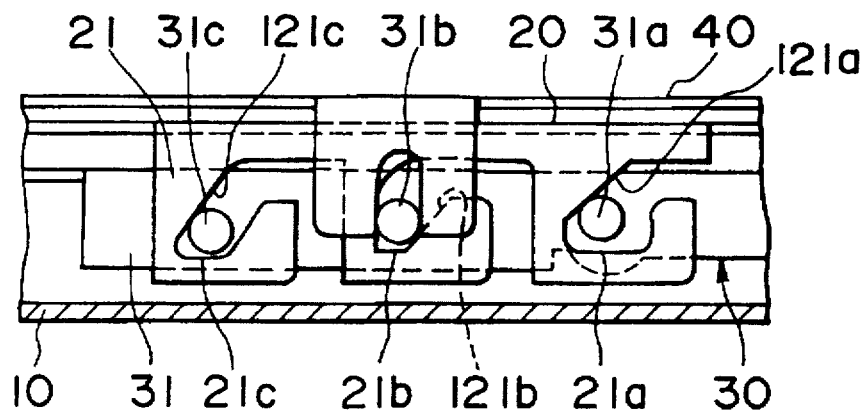
Figure 8A:
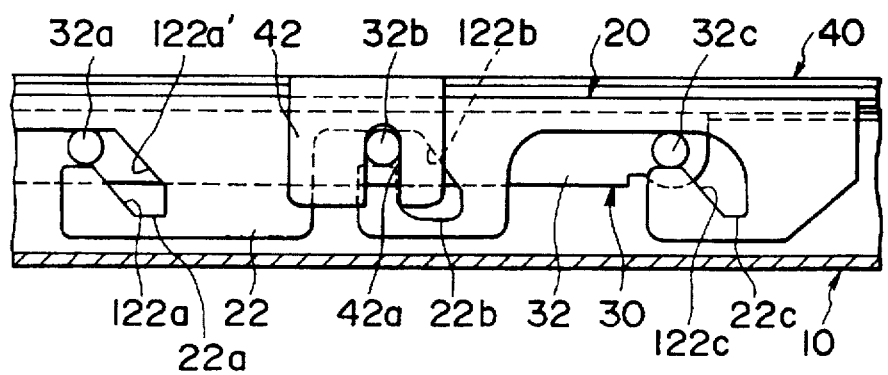
Figure 8B:
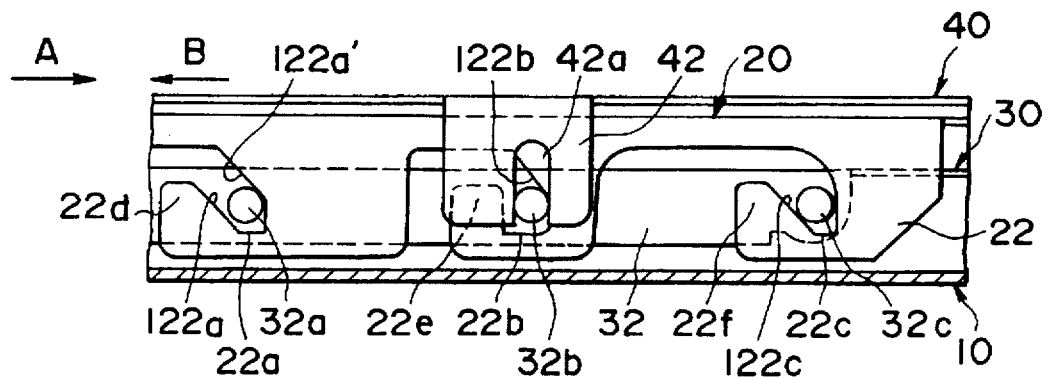

Next, a description of the operation of disk drive apparatus according to the second embodiment of the present invention will be given. First, when the above-described floppy disk drive is to be used, the disk holder 30 is normally in the eject position, as shown in FIGS. 7(A) and 8(A). In this state, when a floppy disk cartridge is inserted into the disk holder 30, the eject plate 20 is released from its latched state with the latching device, and then the biasing force of the spring means causes the eject plate 20 to move from the first position to the second position. At this time, in conjunction with the movement of the eject plate 20, the downward-movement slanting cam surfaces 121a, 121c formed in the front and rear guide portions 21a, 21c of the left side plate 21 push the front and rear guide pins 31a, 31c of the left side plates 31 of the disk holder 30 downward. At the same time, the downward-movement slanting cam surfaces 122b formed in the center guide portion 22b of the right side plate 22 of the eject plate 20 pushes the center guide pin 32b of the right side plate 32 of the disk holder 30 downward. As a result, the disk holder 30 is guided downward by the pin guide grooves 41a, 42a of the subframe 40 from the eject position to the chucking position shown in FIGS. 7(B) and 8(B).

In this way, when chucking is carried out with the floppy disk drive of the second embodiment, the disk holder 30 is moved and then pushed down by the two guide pins 31a, 31c of the left side plate 31 and the one guide pin 32b of the right side plate 32. Further, as was described above, when the disk holder 30 is in the chucking position, it is additionally held in place by the assistance of the slanting surface 122a' of the front guide portion 22a of the right side plate 22 which abuts the front guide pin 32a of the right side plate 32 of the disk holder 30.

On the other hand, when the disk holder 30 is to be moved from the chucking position to the eject position, an eject button 25 (see FIG. 4(B)) is operated so as to push the eject plate 20 against the biasing force of the spring means. When this eject operation is carried out, the eject plate 20 is moved from the second position to the first position, and in conjunction with this movement, the upward-movement slanting cam surface 121b formed in the center guide portion 21b of the left side plate 21 of the eject plate 20 pushes the center guide pin 31b of the left side plate 31 of the disk holder 30 upward. At the same time, the upward-movement slanting cam surfaces 122a, 122c formed in the front and rear guide portions 22a, 22c of the right side plate 22 of the eject plate 20 push the front and rear guide pins 32a, 32c of the right side plate 32 of the disk holder 30 upward. As a result, the disk holder 30 is guided upward along the pin grooves 41a, 42a of the subframe 40 from the chucking position to the eject position.

In this way, when an eject operation is carried out with the floppy disk drive of the second embodiment, the disk holder 30 is moved by the two guide pins 32a, 32c of the right side plate 32 and the one guide pin 31b of the left side plate 31. Further, when the disk holder 30 is in the chucking position, it is held in place by the two guide pins 31a, 31c of the left side plate 31 and the one guide pin 32b of the right side plate 32. In this way, even in the second embodiment, since the disk holder 30 is held at the chucking position with the three guide portions, it is possible to hold the cartridge at the chucking portion in a stable manner.

As stated in the above, in the floppy disk drive according to this second embodiment, the positions and spacings of the guide pins on the left and right side plates of the disk holder are asymmetrical with each other, and such asymmetrical arrangement of the guide pins may arise unbalanced movement when the disk holder is raised or lowered. However, if such an unbalanced condition would be caused, it can be compensated by appropriately changing the number and order of the first and second guide portions in one side plate from those in the other side plate appropriately as stated in the above. In this regard, it should be noted that, in this embodiment, it is also sufficient for each of the guide portions in the eject palate to have either of the upward-movement slanting cam surface or the downward-movement slanting cam surface; there is no need to precisely control dimensions such as the diameter of the guide pins and the width of the guide grooves as is required in the prior art having slanting guide grooves.

In the embodiments above, the disk holder up and down movement mechanism according to the present invention is used in a disk drive apparatus comprised of a mainframe equipped with a special carriage mechanism. However, the present invention is not limited to use in such a disk drive apparatus having such a specific carriage mechanism. Instead, the present invention may be applied to a disk drive apparatus comprised of mainframes having commonly used carriage mechanisms like that shown in FIG. 9. In this case, both the left and right side plates and the guide pins would be formed with left-right symmetry. Further, it is possible to arrange the front and rear first guide portions of the left and right side plates of the eject plate and the second guide portions provided therebetween to have left-right symmetry. Even with this construction, there is no need for high dimensional accuracy when producing the guide pins and guide portions, and it is possible at the time of chucking to maintain the disk holder in a stable position by means of four left and right, front and rear widely spaced guide pins.

Further, in the embodiments as described above, three guide pins and guide portions are provided on the side plates of the disk holder and eject plate. However, the number of guide pins and guide portions to be provided in the respective side plates of the disk holder and eject plate is not limited to three.

Furthermore, even though the present embodiment was described in the above embodiments for the case of floppy disk drives, it is also possible to apply the present invention to other disk drive apparatus for cartridge type recording mediums.

Finally, it is to be noted that many changes and additions may be made to the above-described embodiments without departing from the scope of the present invention as defined by the appended claims.

What is claimed is:

1. A disk drive apparatus having an improved disk loading mechanism comprising:

a mainframe having a disk table which is rotated by a spindle motor;

a disk holder in which a cartridge having a disk therein is adapted to be held, said disk holder having a pair of side plates provided in parallel with an insertion direction of the cartridge, and said disk holder is movable vertically with respect to the mainframe between a first position at which the cartridge can be inserted into or removed from the disk holder and a second position, that is moved downwardly from the first position, at which the disk housed within the inserted cartridge can be placed on the disk table;

an eject plate having a pair of side plates which are provided so as to correspond to said side plates of said disk holder, respectively, said eject plate being slidably movable on said mainframe along the cartridge insertion direction between a first position and a second position which is shifted from the first position toward a removal direction of the cartridge; and means for downwardly moving said disk holder from its first position to its second position when said eject plate is moved from its first position to its second position, and for upwardly moving said disk holder from its second position to its first position when said eject plate is moved from its second position to its first position;

wherein said disk holder moving means comprises at least three guide means which are provided on each of said side plates of said eject plate so as to correspond to the pins of said disk holder, respectively, in such a manner that these guide means are cooperatively engaged with the corresponding pins, respectively, and said at least three guide means in each of said side plates of said eject plate include at least one first guide portion which has a slanting cam surface which acts on the corresponding pin so as to push it downwardly when said eject plate is moved from its first position to its second position, and at least one second guide portion which has a slanting cam surface which acts on the corresponding pin so as to push it upwardly when said eject plate is moved from its second position to its first position.

2. The disk drive apparatus as claimed in claim 1, wherein each of said side plates of said eject plate has two said first guide portions and one said second guide portion.

3. The disk drive apparatus as claimed in claim 2, wherein said second guide portion is arranged between said first guide portions in each of said side plates of said eject plate.

4. The disk drive apparatus as claimed in claim 1, wherein the number of the first and second guide portions and the order of the arrangement thereof in one of said side plates of said eject plate are different from those of the other side plate in order to perform smooth up and down movement of said disk holder.

5. The disk drive apparatus as claimed in claim 4, wherein one of said side plates of said disk holder is shorter than that of the other side plate in its length in the insertion direction of the cartridge.

6. The disk drive apparatus as claimed in claim 1 wherein one of said guide pins in each of said side plates of said disk holder acts as a guide for the vertical motion of said disk holder.

7. The disk drive apparatus as claimed in claim 4, wherein one of said side plates of said disk holder is shorter than that of the other side plate in its length in the insertion direction of the cartridge, and one of the side plates of the eject plate is shorter than that of the other side plate thereof in the same manner as the disk holder, in which one of said side plates of said eject plate has two said first guide portions and one second guide portion, and the other side plate has one said first guide portion and two said second guide portions.

8. A disk drive apparatus having an improved disk loading mechanism comprising:

a mainframe having a disk table which is rotated by a spindle motor;

a disk holder in which a cartridge having a disk therein is adapted to be held, said disk holder having a pair of side plates provided in parallel with an insertion direction of the cartridge, and said disk holder is movable vertically with respect to the mainframe between a first position at which the cartridge can be inserted into or removed from the disk holder and a second position, that is moved downwardly from the first position, at which the disk housed within the inserted cartridge can be placed on the disk table;

an eject plate having a pair of side plates which are provided so as to correspond to said side plates of said disk holder, respectively, said eject plate being slidably movable on said mainframe along the cartridge insertion direction between a first position and a second position which is shifted from the first position toward a removal direction of the cartridge; and means for downwardly moving said disk holder from its first position to its second position when said eject plate is moved from its first position to its second position, and for upwardly moving said disk holder from its second position to its first position when said eject plate is moved from its second position to its first position;

wherein said disk holder moving means comprises at least three pins provided on each of the side plates of said disk holder, and at least three guide means which are provided on each of said side plates of said eject plate so as to correspond to the pins of said disk holder, respectively, in such a manner that these guide means are cooperatively engaged with the corresponding pins, respectively, and said guide means include a first guide portion which has only a slanting cam surface which acts on the corresponding pin so as to push it downwardly when said eject plate is moved from its first position to its second position, and a second guide portion which has only a slanting cam surface which acts on the corresponding pin so as to push it upwardly when said eject plate is moved from its second position to its first position, and wherein in each of the side plates of said eject plate, there are provided two said first guide portions and one said first guide portion positioned between said first guide portions.

9. A disk drive apparatus having an improved disk loading mechanism comprising:

a mainframe having a disk table which is rotated by a spindle motor;

a disk holder in which a cartridge having a disk therein is adapted to be held, said disk holder having a pair of left and right plates provided in parallel with an insertion direction of the cartridge, and said disk holder is movable vertically with respect to the mainframe between a first position at which the cartridge can be inserted into or removed from the disk holder and a second position, that is moved downwardly from said first position, at which the disk housed within the inserted cartridge can be placed on the disk table;

an eject plate having a pair of left and right side plates which are provided so as to correspond to said side plates of said disk holder, respectively, said eject plate being slidably movable on said mainframe along the cartridge insertion direction between a first position and a second position which is shifted from the first position toward a removal direction of the cartridge; and means for downwardly moving said disk holder from its first position to its second position when said eject plate is moved from its first position to its second position, and for upwardly moving said disk holder from its second position to its first position when said eject plate is moved from its second position to its first position;

wherein said disk holder moving means comprising at least three pins provided on each of the left and right side plates of said disk holder in such a manner that positions and spacing of the pins on the left side are different from those of the pins on the right side plate, and at least three guide means which are provided on each of the left and right side plates of said eject plate so as to correspond to the pins of said disk holder, respectively, in such a manner that these guide means are cooperatively engaged with the corresponding pins, respectively, and said guide means in each side plate of said eject plate include a first guide portion which has a slanting cam surface which acts on the corresponding pin so as to push it downwardly when said eject plate is moved from its first position to its second position, and a second guide portion which has a slanting cam surface which acts on the corresponding pin so as to push it upwardly when said eject plate is moved from its second position to its first position.

10. The disk drive apparatus as claimed in claim 9 wherein the number and/or order of the first and second guide portions in the left side plate of the eject plate are different from those of the right side plate in order to perform smooth up and down movement of the disk holder.

11. The disk drive apparatus as claimed in claim 9, wherein one of said left and right side plates of said disk holder is shorter than that of the other side plate in its length in the insertion direction of the cartridge, and one of the left and right side plates of the eject plate is shorter than that of the other side plate .thereof in the same manner as the disk holder, in which two first guide portions and one second guide portion are formed on said one side plate of said eject plate and shorter first guide portion and two second guide portions are formed on the other side plate of said eject plate.

* * * * *